United States Patent
Kobayashi et al.

(10) Patent No.: US 7,732,733 B2
(45) Date of Patent: Jun. 8, 2010

(54) FERRITIC STAINLESS STEEL WELDING WIRE AND MANUFACTURING METHOD THEREOF

(75) Inventors: Masaaki Kobayashi, Hamamatsu (JP); Satoru Nonaka, Hamamatsu (JP); Yukio Agata, Hamamatsu (JP); Teiichiro Saito, Hamamatsu (JP); Tadashi Ito, Hamamatsu (JP)

(73) Assignee: Nippon Welding Rod Co., Ltd., Tokyo (JP)

( * ) Notice: Subject to any disclaimer, the term of this patent is extended or adjusted under 35 U.S.C. 154(b) by 1026 days.

(21) Appl. No.: 11/338,075

(22) Filed: Jan. 24, 2006

(65) Prior Publication Data

US 2006/0163231 A1 Jul. 27, 2006

(30) Foreign Application Priority Data

Jan. 26, 2005 (JP) .............................. 2005-018868

(51) Int. Cl.
B23K 35/22 (2006.01)
B23K 35/34 (2006.01)
B23K 33/00 (2006.01)
B23K 35/30 (2006.01)

(52) U.S. Cl. .............................. 219/146.1; 219/146.23; 219/137 R

(58) Field of Classification Search ............... 219/146.1, 219/146.23, 145.1, 137 R; 420/34, 62, 103
See application file for complete search history.

(56) References Cited

U.S. PATENT DOCUMENTS

| | | | | |
|---|---|---|---|---|
| 3,640,690 A * | 2/1972 | Ries et al. | ................. | 428/683 |
| 4,843,212 A * | 6/1989 | Shneerov et al. | ....... | 219/146.23 |
| 5,519,186 A | 5/1996 | Sakurai et al. | | |
| 5,556,561 A | 9/1996 | Ishikawa et al. | | |
| 5,945,064 A | 8/1999 | Komai et al. | | |
| 7,026,576 B2 * | 4/2006 | Inui et al. | ................. | 219/146.1 |
| 2003/0189034 A1 * | 10/2003 | Kataoka et al. | .......... | 219/146.1 |
| 2004/0140303 A1 * | 7/2004 | Kataoka et al. | ..... | 219/137 WM |

FOREIGN PATENT DOCUMENTS

| JP | 57154395 A | * | 9/1982 |
|---|---|---|---|
| JP | 57156893 A | * | 9/1982 |
| JP | 62228431 A | * | 10/1987 |
| JP | 2500008 | | 3/1996 |

(Continued)

*Primary Examiner*—M. Alexandra Elve
(74) *Attorney, Agent, or Firm*—Pearne & Gordon LLP

(57) ABSTRACT

The present invention provides a ferritic stainless steel welding wire which allows prevention of wire breaking, fine refining of crystal grains, and increased cracking resistance.

A wire rod used essentially consists of, in mass %, 0.03% or less of C, 3% or less of B, 3% or less of Mn, 2% or less of Ni, 11 to 20% of Zr, 3% or less of Mo, 1% or less of Co, 2% or less of Cu, 0.02 to 2.0% of Al, 0.2 to 1.0% of Ti, 0.02% or less of O, 0.04% or less of N, at least one of Nb and Ta, the mass % thereof being eight times the total mass % of the C and N to 1.0 mass %, and the balance of Fe and unavoidable impurities. When the number of crystals per square mm (mm$^2$) of a cross section of the wire rod is defined as m, a grain number of the crystal expressed by an exponent (G) in an expression of m=8×2$^G$ is set to 3 to 10 by the heat treatment.

8 Claims, 8 Drawing Sheets

TABLE 1

FOREIGN PATENT DOCUMENTS

| | | |
|---|---|---|
| JP | 2003-112291 | 4/2003 |
| JP | 2004-42116 | 2/2004 |
| JP | 2004042116 A * | 2/2004 |
| JP | 2004-141934 | 5/2004 |
| JP | 2005-971 | 1/2005 |

* cited by examiner

FIG. 8

TABLE 1

| | C | Si | Mn | Ni | Cr | Mo | Co | Cu | Al | Ti | O | N | Nb,Ta Lower Limit | | P | S | V | W | Zr | B | Ca | Mg |
|---|---|---|---|---|---|---|---|---|---|---|---|---|---|---|---|---|---|---|---|---|---|---|
| Embodiment 1 | 0.01 | 0.46 | 0.43 | 0.42 | 18.98 | 0.3 | 0.06 | 0.42 | 0.029 | 0.66 | 0.005 | 0.005 | 0.12 | 0.26 | 0.004 | 0.004 | — | — | — | — | — | — |
| " 2 | 0.015 | 0.49 | 0.45 | 1.3 | 19.45 | 0.32 | 0.1 | 0.41 | 0.023 | 0.66 | 0.003 | 0.005 | 0.16 | 0.45 | 0.032 | 0.001 | — | — | — | — | — | — |
| " 3 | 0.015 | 0.34 | 0.36 | 0.1 | 17.16 | 0.01 | 0.07 | 0.01 | 0.42 | 0.33 | 0.004 | 0.037 | 0.42 | 0.69 | 0.022 | 0.001 | — | — | — | — | 0.0003 | — |
| " 4 | 0.02 | 0.58 | 0.42 | 0.14 | 15.7 | 0.02 | 0.09 | 0.01 | 0.043 | 0.76 | 0.010 | 0.013 | 0.26 | 0.5 | 0.017 | 0.001 | — | — | — | 0.0003 | 0.0003 | — |
| " 5 | 0.021 | 0.17 | 0.22 | 0.05 | 17.2 | 0.01 | 0.33 | 0.01 | 0.11 | 0.22 | 0.004 | 0.032 | 0.43 | 0.82 | 0.016 | 0.011 | — | — | — | — | — | — |
| " 6 | 0.015 | 1.06 | 0.45 | 0.3 | 19.15 | 1.42 | 0.09 | 0.42 | 0.042 | 0.68 | 0.006 | 0.012 | 0.22 | 0.46 | 0.024 | 0.001 | — | — | — | — | — | — |
| " 7 | 0.004 | 0.46 | 0.4 | 0.33 | 19.1 | 0.3 | 0.85 | 0.46 | 0.021 | 0.35 | 0.005 | 0.022 | 0.21 | 0.44 | 0.006 | 0.004 | — | — | 0.011 | — | — | — |
| " 8 | 0.014 | 0.5 | 2.44 | 0.4 | 17.27 | 0.32 | 0.03 | 0.42 | 0.031 | 0.65 | 0.004 | 0.003 | 0.13 | 0.69 | 0.024 | 0.001 | 0.21 | — | — | — | — | — |
| " 9 | 0.021 | 0.56 | 0.45 | 0.1 | 17.39 | 0.01 | 0.04 | 0.01 | 0.107 | 0.45 | 0.004 | 0.018 | 0.31 | 0.49 | 0.016 | 0.001 | — | — | — | 0.008 | — | — |
| " 10 | 0.019 | 0.56 | 0.43 | 0.12 | 17.31 | 0.01 | 0.09 | 0.01 | 0.049 | 0.46 | 0.006 | 0.028 | 0.37 | 0.69 | 0.017 | 0.001 | — | 0.2 | — | — | — | 0.001 |
| Comparison 1 | 0.068 | 0.75 | 0.52 | 0.28 | 17.47 | 0.03 | — | 0.03 | — | — | 0.004 | 0.021 | 0.71 | — | 0.019 | 0.005 | — | — | — | — | — | — |
| " 2 | 0.055 | 0.18 | 0.27 | 0.06 | 16.76 | — | — | — | 0.14 | 0.22 | 0.005 | 0.025 | 0.64 | 0.36 | 0.016 | 0.01 | — | — | — | — | — | 0.001 |
| " 3 | 0.019 | 0.56 | 0.41 | 2.69 | 17.42 | 0.32 | — | 0.39 | 0.039 | 0.62 | 0.005 | 0.013 | 0.26 | 0.5 | 0.018 | 0.001 | — | — | — | — | — | — |
| " 4 | 0.02 | 0.43 | 0.61 | — | 24.3 | 0.45 | — | — | 0.07 | — | — | 0.020 | 0.32 | 0.5 | 0.02 | 0.004 | — | — | — | — | — | — |
| " 5 | 0.031 | 0.23 | 0.25 | 0.06 | 17.28 | 3.23 | — | — | — | 0.12 | 0.005 | 0.024 | 0.44 | 0.68 | 0.014 | 0.015 | 0.7 | — | — | — | — | — |
| " 6 | 0.016 | 0.39 | 0.37 | — | 13.66 | 0.03 | — | 0.01 | 0.22 | 0.38 | 0.009 | 0.066 | 0.66 | 0.7 | 0.022 | 0.001 | — | — | — | — | — | — |
| " 7 | 0.004 | 0.46 | 0.4 | 0.33 | 19.1 | 0.3 | — | 0.46 | 0.015 | 0.35 | 0.005 | 0.047 | 0.41 | 0.44 | 0.006 | 0.004 | — | — | — | 0.0002 | — | — |
| " 8 | 0.01 | 0.42 | 0.42 | 2.54 | 18.81 | 0.28 | — | 0.26 | 0.024 | 0.48 | 0.005 | 0.050 | 0.48 | 0.38 | 0.002 | 0.003 | 0.1 | — | — | — | — | — |
| " 9 | 0.018 | 0.78 | 0.25 | 0.05 | 16.86 | — | — | — | 0.14 | 0.11 | 0.004 | 0.039 | 0.46 | 0.79 | 0.014 | 0.012 | — | — | — | 0.014 | — | — |
| " 10 | 0.017 | 0.16 | 0.26 | 0.1 | 16.88 | — | 0.05 | — | 0.12 | 0.1 | 0.007 | 0.026 | 0.35 | 0.71 | 0.017 | 0.011 | 0.6 | — | — | — | — | — |
| " 11 | 0.02 | 0.3 | 0.5 | — | 28 | 3.2 | — | — | — | — | 0.004 | 0.030 | 0.40 | 0.5 | 0.02 | 0.008 | — | — | — | — | — | — |
| " 12 | 0.016 | 0.82 | 0.71 | 0.32 | 17.52 | 0.02 | — | 0.01 | 0.025 | 0.17 | 0.003 | 0.022 | 0.30 | — | 0.018 | 0.001 | 0.04 | — | — | — | — | — |
| " 13 | 0.01 | 1.08 | 0.46 | 0.35 | 18.56 | 0.48 | 0.03 | 0.42 | 0.062 | 0.068 | 0.005 | 0.120 | 1.04 | 0.15 | 0.022 | 0.004 | 0.04 | — | — | — | — | — |
| " 14 | 0.009 | 0.42 | 0.33 | 0.1 | 10.73 | 0.02 | — | 0.01 | — | 0.48 | 0.002 | 0.009 | 0.14 | — | 0.025 | 0.003 | — | — | — | — | — | — |
| " 15 | 0.024 | 0.49 | 0.43 | 0.09 | 12.64 | 0.03 | 0.07 | 0.02 | 0.018 | 0.325 | 0.007 | 0.012 | 0.29 | 0.27 | 0.003 | 0.0017 | — | — | — | — | — | — |
| " 16 | 0.058 | 0.9 | 0.47 | 0.24 | 17.27 | 0.05 | — | 0.02 | 0.007 | 0.37 | 0.006 | 0.024 | 0.66 | 0 | 0.025 | 0.001 | — | — | — | — | — | — |
| " 17 | 0.01 | 1.14 | 0.38 | 0.46 | 17.55 | 0.25 | — | 0.15 | 0.002 | — | 0.022 | 0.015 | 0.20 | 0.45 | 0.02 | 0.003 | — | — | — | — | — | — |
| " 18 | 0.014 | 1.12 | 0.48 | 0.16 | 18.62 | 0.13 | — | 2.52 | 0.001 | 0.001 | 0.002 | 0.030 | 0.35 | 0.44 | 0.022 | 0.002 | — | — | — | — | — | — |
| " 19 | 0.023 | 0.09 | 0.09 | 0.03 | 19.01 | — | — | — | — | 0.02 | 0.016 | 0.025 | 0.38 | 0.2 | 0.011 | 0.004 | — | — | — | — | — | — |
| " 20 | 0.02 | 0.43 | 0.39 | 0.08 | 17.9 | 0.01 | — | 0.24 | — | 0.02 | 0.005 | 0.033 | 0.42 | 0.49 | 0.017 | 0.002 | 0.04 | — | — | — | — | — |
| " 21 | 0.02 | 0.42 | 0.38 | 0.26 | 17.54 | 0.26 | — | 0.003 | 0.025 | 0.02 | 0.003 | 0.019 | 0.31 | 0.47 | 0.017 | 0.003 | 0.04 | — | — | — | — | — |
| " 22 | 0.01 | 0.36 | 0.38 | 0.13 | 16.77 | 0.01 | — | 0.07 | 0.062 | — | 0.006 | 0.031 | 0.33 | — | 0.023 | 0.003 | — | — | — | — | — | — |
| " 23 | 0.017 | 0.66 | 0.48 | 0.32 | 11.21 | 0.07 | — | 0.05 | — | — | 0.004 | 0.028 | 0.36 | 0.49 | 0.015 | 0.002 | — | — | — | — | — | — |
| " 24 | 0.019 | 0.81 | 0.71 | 0.29 | 17.6 | 0.03 | 0.04 | 0.04 | 0.026 | 0.21 | 0.003 | 0.034 | 0.42 | — | 0.018 | 0.001 | — | — | — | — | — | — |
| " 25 | 0.015 | 0.5 | 0.38 | 0.2 | 18.51 | 0.02 | — | 0.02 | — | — | 0.005 | 0.019 | 0.27 | 0.52 | 0.018 | 0.003 | — | — | — | — | — | — |

FIG. 9

TABLE 2

|  | Heat Treatment 1 | | Heat Treatment 2 | |
| --- | --- | --- | --- | --- |
|  | Grain Number | Determination | Grain Number | Determination |
| Embodiment 1 | 6.5 | ◎ | >12 | × |
| " 2 | 8 | ◎ | >12 | × |
| " 3 | 6 | ◎ | 11 | △ |
| " 4 | 7 | ◎ | >12 | × |
| " 5 | 6 | ◎ | 10 | ○ |
| " 6 | 5.5 | ◎ | >12 | × |
| " 7 | 6 | ◎ | 12 | △ |
| " 8 | 7 | ◎ | >12 | × |
| " 9 | 7 | ◎ | >12 | × |
| " 10 | 5 | ◎ | >12 | × |
| Comparison 1 | −1 | × | 5 | ◎ |
| " 2 | 5 | ◎ | >12 | × |
| " 3 | 6 | ◎ | 11 | △ |
| " 4 | 1 | × | 3 | ○ |
| " 5 | 3 | ○ | 7 | ◎ |
| " 6 | 5 | ◎ | >12 | × |
| " 7 | 8 | ◎ | 8 | ○ |
| " 8 | 6 | ◎ | 10 | △ |
| " 9 | 7 | ◎ | 11 | △ |
| " 10 | 3 | × | 11 | △ |
| " 11 | 5.5 | ◎ | 12 | △ |
| " 12 | 1 | × | 6 | ○ |
| " 13 | 2 | × | 7 | ○ |
| " 14 | 2.5 | × | 5 | ○ |
| " 15 | 4 | ◎ | 4 | ○ |
| " 16 | 2 | × | 5 | ○ |
| " 17 | 2.5 | × | 7 | ◎ |
| " 18 | 2 | × | 8 | ◎ |
| " 19 | 1 | × | 8 | ◎ |
| " 20 | 2.5 | × | 7 | ◎ |
| " 21 | 2 | × | 7 | ◎ |
| " 22 | −1 | × | 8 | ◎ |
| " 23 | 2 | × | 7 | ◎ |
| " 24 | 0 | × | 12 | △ |
| " 25 | 2.5 | × | 6 | ◎ |

FIG. 10

TABLE 3

| | Cracking Resistance Test | | Grain Number | Flexural Property Test | | | Tensile Strength Test (Mpa) | | | | Corrosion Resistance Test | Oxidation Resistance Test (g/cm2) |
|---|---|---|---|---|---|---|---|---|---|---|---|---|
| | 60 cpm | 80 cpm | | 20mm | 40mm | 60mm | RT | 700°C | 900°C | | | |
| Embodiment 1 | ○ | ○ | 5 | ○ | ○ | ○ | 480 | 135 | 25 | | ○ | 0.67 |
| " 2 | ○ | ○ | 4.5 | ○ | ○ | ○ | 495 | 149 | 26 | | ○ | 0.66 |
| " 3 | ○ | ○ | 3.5 | ○ | ○ | ○ | 500 | 166 | 25 | | ○ | 0.69 |
| " 4 | ○ | ○ | 4.5 | ○ | ○ | ○ | 478 | 125 | 23 | | ○ | 0.91 |
| " 5 | ○ | ○ | 6 | ○ | ○ | ○ | 490 | 148 | 25 | | ○ | 0.68 |
| " 6 | ○ | ○ | 6.5 | ○ | ○ | ○ | 468 | 136 | 24 | | ○ | 0.65 |
| " 7 | ○ | ○ | 5 | ○ | ○ | ○ | 505 | 146 | 26 | | ○ | 0.65 |
| " 8 | ○ | ○ | 3.5 | ○ | ○ | ○ | 486 | 129 | 25 | | ○ | 0.68 |
| " 9 | ○ | ○ | 3.5 | ○ | ○ | ○ | 508 | 166 | 25 | | ○ | 0.69 |
| " 10 | ○ | ○ | 3.5 | ○ | ○ | ○ | 493 | 175 | 24 | | ○ | 0.67 |
| Comparison 1 | ○ | ○ | 1 | ○ | △ | × | 477 | 156 | 23 | | × | 0.69 |
| " 2 | ○ | ○ | 1 | ○ | ○ | ○ | 492 | 175 | 25 | | × | 0.71 |
| " 3 | ○ | ○ | 2 | ○ | ○ | ○ | 476 | 149 | 25 | | ○ | 0.68 |
| " 4 | △ | △ | 1 | ○ | ○ | × | 486 | 165 | 26 | | ○ | 0.43 |
| " 5 | × | × | 2 | ○ | ○ | △ | 495 | 185 | 24 | | ○ | 0.66 |
| " 6 | △ | ○ | 6.5 | ○ | ○ | ○ | 466* | 134* | 21* | | △ | 1.29 |
| " 7 | ○ | △ | 2 | ○ | ○ | × | 485 | 154 | 24 | | △ | 0.69 |
| " 8 | ○ | ○ | 2 | ○ | ○ | △ | 496 | 147 | 24 | | × | 0.69 |
| " 9 | △ | × | 3 | ○ | ○ | ○ | 479 | 165 | 25 | | ○ | 0.67 |
| " 10 | △ | × | 4 | ○ | ○ | ○ | 498 | 158 | 24 | | ○ | 0.68 |
| " 11 | ○ | △ | 1 | ○ | △ | × | 512 | 175 | 26 | | △ | 0.33 |
| " 12 | ○ | ○ | 4 | ○ | ○ | ○ | 507 | 146 | 26 | | ○ | 0.65 |
| " 13 | ○ | ○ | 5 | ○ | ○ | △ | 483 | 165 | 24 | | △ | 0.67 |
| " 14 | ○ | △ | 1 | ○ | △ | △ | 472* | 144* | 23* | | × | 1.73 |
| " 15 | ○ | △ | 2 | ○ | ○ | △ | 469* | 129* | 22* | | × | 1.38 |
| " 16 | ○ | ○ | 1 | ○ | △ | × | 505 | 146 | 24 | | × | 0.70 |
| " 17 | × | × | 1 | ○ | △ | △ | 479 | 158 | 25 | | △ | 0.67 |
| " 18 | △ | △ | 1 | ○ | △ | △ | 488 | 166 | 25 | | ○ | 0.66 |
| " 19 | ○ | ○ | 1 | ○ | ○ | △ | 494 | 138 | 26 | | × | 0.66 |
| " 20 | ○ | △ | 1 | ○ | △ | △ | 486 | 140 | 23 | | ○ | 0.59 |
| " 21 | ○ | △ | 1 | ○ | ○ | × | 493 | 161 | 23 | | ○ | 0.67 |
| " 22 | ○ | ○ | 1 | ○ | ○ | △ | 507 | 157 | 25 | | × | 0.69 |
| " 23 | ○ | × | 1 | ○ | ○ | △ | 476* | 143* | 23* | | ○ | 1.42 |
| " 24 | ○ | ○ | 1 | ○ | ○ | △ | 488 | 149 | 24 | | △ | 0.79 |
| " 25 | ○ | △ | 1 | ○ | △ | × | 496 | 153 | 25 | | ○ | 0.67 |

FIG. 11

TABLE 4

| | Cracking Resistance Test | | Grain Number | Flexural Property Test | | | Tensile Strength Test (Mpa) | | | Corrosion Resistance Test | Oxidation Resistance Test (g/cm2) |
|---|---|---|---|---|---|---|---|---|---|---|---|
| | 60 cpm | 80 cpm | | 20mm | 40mm | 60mm | RT | 700°C | 900°C | | |
| Embodiment 1 | O | O | 5 | O | O | O | 475 | 140 | 23 | O | 0.68 |
| " 2 | O | O | 4.5 | O | O | O | 490 | 153 | 26 | O | 0.65 |
| " 3 | O | O | 4 | O | O | O | 500 | 165 | 24 | O | 0.71 |
| " 4 | O | O | 5 | O | O | O | 480 | 135 | 25 | O | 0.89 |
| " 5 | O | O | 6 | O | O | O | 490 | 148 | 25 | O | 0.68 |
| " 6 | O | O | 6.5 | O | O | O | 460 | 136 | 23 | O | 0.66 |
| " 7 | O | O | 5 | O | O | O | 505 | 146 | 26 | O | 0.65 |
| " 8 | O | O | 4 | O | O | O | 480 | 135 | 24 | O | 0.71 |
| " 9 | O | O | 3.5 | O | O | O | 510 | 160 | 25 | O | 0.70 |
| " 10 | O | O | 3.5 | O | O | O | 500 | 170 | 25 | O | 0.66 |

# FERRITIC STAINLESS STEEL WELDING WIRE AND MANUFACTURING METHOD THEREOF

TECHNICAL FILED OF THE INVENTION

The present invention relates to a ferritic stainless steel welding wire commonly used in gas shielded arc welding as well as a manufacturing method thereof, more specifically to a ferritic stainless steel welding wire suitable for use in welding parts for an automobile exhaust system as well as a manufacturing method thereof.

BACKGROUND OF THE INVENTION

A ferritic stainless steel has been known as a raw material in manufacturing a wire to be used for gas shielded arc welding. Ferritic stainless steels are low-priced compared with austenite stainless steels, and are not likely to cause heat fatigue since they has low heat expansion efficient. A weld metal formed by using such wire (a metal of a welded portion where a welded base material and a welding material or welding wire have been mixed) exhibits excellent cracking resistance in the presence of a chloride. In some cases where a ferritic stainless steel is used as a base material in welding, a small amount of martensite is formed by a component such as Cr (Chromium) in a portion of the base material that is thermally affected by welding. Most portions of the base material, however, remain ferritic. Since the ferritic stainless steel is hardly deformed, the formation of martensite is increased in the weld metal when an amount of heat becomes large during welding. As a result, the martensite crystals are coarsened, thereby weakening the weld metal.

When a ferritic stainless steel is used as a base material and the same material (or a material having a similar composition to that of the base material) is used as a welding wire the foregoing also applies to a weld metal which is formed by welding the base material. Due to the presence of coarsened crystals, the weld metal has low tensile strength, and is also low in toughness as measured by Charpy impact test and flexural property. In addition, the cracking resistance of the weld metal is also decreased. Although the tensile strength can be increased by heat treatment after welding, the toughness as measured by Charpy impact test and flexural property cannot be improved even after the heat treatment.

As is shown in Japanese Patent Application Laid-open Publication No. 2004-42116, Japanese Patent Application Laid-open Publication No. 2004-141934, Japanese Patent Application Laid-open Publication No. 2005-971, and Japanese Patent No. 2500008, a ferritic stainless steel wire having high cracking resistance has been proposed whereby coarsening of weld metal crystals is prevented by adding a small amount of Al (Aluminum) and Ti (Titanium).

In the specification of the present invention, "high cracking resistance" means that the beads (weld metal) are not readily cracked after welding, and "low cracking resistance" means that the weld metal is readily cracked after welding. "High flexural property" means that the weld metal is not readily cracked when the metal is bent and "low flexural property" means that the weld metal is readily cracked when the metal is bent. "High corrosion resistance" means that the weld metal is not readily corroded and "low corrosion resistance" means that the weld metal is readily corroded. "High oxidation resistance" means that the weld metal is not readily oxidized and "low oxidation resistance" means that the weld metal is readily oxidized.

Especially, the following requirements are necessary for a ferritic stainless steel welding wire for use in welding parts of an automobile exhaust system.

(1) Prevention of wire breaking and ease of manufacturing
(2) High cracking resistance of the weld metal
(3) Large grain number and small grain size of the weld metal
(4) High flexural property of the weld metal
(5) Tensile strength of the weld metal up to high temperature above the standard which is required for the base material
(6) High corrosion resistance of the weld metal
(7) High oxidation resistance of the weld metal The conventional ferritic stainless steel wires do not satisfy all of these requirements. Usually, welding of parts used in an automobile exhaust system are efficiently done by automatic equipment such as a robot. In these circumstances, welding must be stabilized by using a wire having adequate hardness and smooth surface and supplying the wire smoothly.

SUMMARY OF THE INVENTION

An object of the present invention is to provide a ferritic stainless steel welding wire which has a small crystal grain size and can be improved in cracking resistance, flexural property, tensile strength up to high temperature, corrosion resistance and oxidation resistance.

Another object of the present invention is to provide a ferritic stainless steel welding wire of which breaking can be prevented and ease of manufacturing is attained, and a manufacturing method thereof.

A ferritic stainless steel welding wire according to the present invention consists essentially of, by mass or weight, 0.03% or less C (Carbon), 3% or less Si (Silicon), 3% or less Mn (Manganese), 2% or less Ni (Nickel), 11 to 20% Cr (Chromium), 3% or less Mo (Molybdenum), 1% or less Co (Cobalt), 2% or less Cu (Copper), 0.02 to 2.0% Al (Aluminum), 0.2 to 1.0% Ti (Titanium), 0.02% or less O (Oxygen), 0.04% or less N (Nitrogen), and at least one of Nb (Niobium) and Ta (Tantalum) in mass % of eight times the total mass percent of C and N to 1.0 mass %. The balance or remainders are Fe (Iron) and unavoidable impurities.

When the ferritic stainless steel welding wire of the present invention is used, the grain number of a weld metal can be increased and the grain size of the weld metal crystals can be reduced (fine refining). Thus, according to the present invention, the weld metal can be improved in cracking resistance, flexural property, tensile strength up to high temperature, corrosion resistance and oxidation resistance.

In the specification of the present invention, "grain number" means a number (G) which has been defined in accordance with the comparison method specified in Section 6.1 of JIS-G-0552 "Methods of Ferrite Grain Determination Test for Steels" of the Japan Industrial Standard (JIS). This grain number (G) is an exponent (G) in an expression of $m=8\times2^G$ where m is defined as the number of crystals per square mm ($mm^2$) of a cross section of a material to be tested. A weld metal has a cast or casted structure formed when a base material (to be welded) and a welding material are partially molten by a heat source such as arc, and a resulting molten metal is solidified in a short time. The grain number of the weld metal can be adjusted depending upon the composition of a welding wire.

According to the present invention, by adding an appropriate amount of Al and Ti to the composition of the welding wire, fine crystals of the weld metal can be effectively obtained. By adding at least one of Nb and Ta to the composition, the corrosion resistance of the weld metal can be increased.

Now, the effects of respective elements of the composition and reasons for limiting the respective contents to certain ranges will be described below.

C (Carbon) is an austenite forming element and acts to increase the strength of the weld metal. When the content of C exceeds 0.03 mass %, the corrosion resistance of the weld metal is decreased. Consequently, martensite is formed during cooling process after welding, thereby causing more frequent cracking in the weld metal. Then, the content of C is set to 0.03 mass % or less.

Si (Silicon) and Mn (Manganese) act for deoxidation. When the content of Si is increased, the toughness of the weld metal is decreased, resulting in reduced ductibility of the weld metal. When the content of Mn is increased, the weld metal is losing its workability, and its oxidation resistance is reduced. Then, the amount of each of these elements is set to 3 mass % or less.

Ni (Nickel) is an austenite forming element and acts to increase the ductibility, toughness, and flexural property of the weld metal. When the content of Ni is increased, the cracking resistance of the weld metal is decreased. Then, the content of Ni is set to 2 mass % or less.

Cr (Chromium) is a ferrite forming element and acts to increase the high temperature strength, corrosion resistance, and oxidation resistance of the weld metal. When the content of Cr is below 11 mass %, sufficient effect cannot be expected. When it exceeds 20 mass %, a wire is hardened and it accordingly becomes difficult to manufacture the wire. Then, the content of Cr is set to 11 to 20 mass % or less.

Mo (Molybdenum) is a ferrite forming element and acts to increase the high temperature strength and corrosion resistance of the weld metal. When the content of Mo exceeds 3 mass %, the toughness and flexural property of the weld metal are reduced. Then, the content of Mo is set to 3 mass % or less.

Co (Cobalt) acts to improve high temperature properties such as tensile strength at high temperature and oxidation resistance of the weld metal. However, Co is high-priced. Taking account of an aspect of manufacturing costs, the content of Co is set to 1 mass % or less.

Cu (Copper) acts to improve the fluidity of the weld metal and form good beads. Adding a small amount of Cu can improve the weld metal in cracking resistance, toughness, and flexural property. When the content of Cu exceeds 2 mass %, these properties of the weld metal are deteriorated. Then, the content of Cu is set to 2 mass % or less.

Al (Aluminum) and Ti (Titanium) act as a deoxidizer. During welding process, Al reacts with N to generate a nitride and with O to generate an oxide. Also, during welding process, Ti reacts with N to generate a nitride and with C to generate a carbide. Then, fine equiaxed crystals are obtained, in which these nitride and oxide form the core of the crystal structure. A Ti carbide is more readily generated than a Cr carbide. The Ti carbide acts to prevent a decrease in corrosion resistance which is caused when the content of Cr is decreased. When the content of Al is below 0.02 mass % and that of Ti is lower than 0.2 mass %, the above-mentioned effect cannot be obtained. When the content of Al exceeds 2.0 mass % and the content of Ti is more than 1.0 mass %, the wire is more likely to be broken during manufacturing. Extra nitrides and oxides become slag, and beads become poor in appearance. Then, the content of Al is set to 0.02 to 2.0 mass %, and that of Ti to 0.2 to 1.0 mass %.

During manufacturing process of the wire, some amount of O (Oxygen) is inevitably contained in the wire. When an amount of oxygen contained becomes large, excessive oxides are generated in the weld metal, resulting in reduced toughness and flexural property of the weld metal. Then, the content of O is set to be 0.02 mass % or less. To accomplish this, the wire may be manufactured in an atmosphere with low O density.

N (Nitrogen) is an austenite forming element. As described above, N reacts respectively with Al and Ti to generate a nitride. This nitride becomes a core during cooling process after the weld metal has been solidified, and a structure of fine equiaxed crystals is generated. When the content of N exceeds 0.04 mass %, the cracking resistance, toughness, and flexural property of the weld metal are reduced. Then, the content of N is set to 0.04 mass % or less.

Nb (Niobium) and Ta (Tantalum) are elements of the Va group of the periodic table, and are similar in nature. They are carbonitride forming elements and act to suppress deposition of a Cr carbide which causes the corrosion resistance of the weld metal to decrease. This effect cannot be obtained if the mass percent of at least one of Nb and Ta is lower than the mass percent which is eight times the total mass % of C and N. For example, when C is 0.01 mass % and N is 0.005 mass %, the above-mentioned effect cannot be obtained if the content of at least one of Nb and Ta falls below 0.12 mass % calculated as (0.01 mass %+0.005 mass %)×8=0.12 mass %. When the content of at least one of Nb and Ta exceeds 1.0 mass %, the cracking resistance, toughness, and flexural property of the weld metal are reduced, and the wire becomes more subject to breaking during manufacturing. Then, the content of at least one of Nb and Ta is set to eight times the total of the above-mentioned mass % to 1.0 mass %.

In addition to the above-mentioned composition, at least one of 0.04 mass % or less of P (Phosphorous), 0.02 mass % or less of S (Sulfur), 0.5 mass % or less of V (Vanadium), 0.5 mass % or less of W (Tungsten), 0.02 mass % or less of Zr (Zirconium), 0.02 mass % or less of B (Boron), 0.005 mass % or less of Ca (Calcium), and 0.005 mass % or less of Mg (Magnesium) may be added to the composition of the wire.

An increase in content of either of P and S reduces the cracking resistance and toughness of the weld metal, thereby lowering the flexural property of the weld metal. For example, when P and S are contained in the composition as impurities, the content of P must be set o less 0.04 mass % or less and that of S to 0.02 mass % or less. V is a carbide forming element and acts to suppress deposition of Cr carbide which causes the corrosion resistance of the weld metal to decrease. When the content of V exceeds 0.5 mass %, welding arc becomes unstable. W acts to increase the high-temperature strength and corrosion resistance of the weld metal. When the content of W exceeds 0.5 mass %, the toughness and flexural property of the weld metal are reduced. Zr, B, Ca, and Mg respectively act for deoxidation and improve metallic workability. When the content of Zr is above 0.02 mass %, that of B above 0.02 mass %, that of Ca above 0.005 mass %, or that of Mg above 0.005 mass %, welding arc becomes unstable. For these reasons, the upper limit for each of P, S, Zr, B, Ca, and Mg contents is determined.

In view of all the aspects, a wire of the present invention satisfies all of the requirements for welding parts used in an automobile exhaust system. Therefore, especially when the wire of the present invention is used as a welding material for the parts of the automobile exhaust system, remarkable meritorious effects can be attained.

Typically, a ferritic stainless steel wire is manufactured by subjecting a wire rod to heat treatment, followed by drawing or wire drawing by using dies to make the wire thinner so that the diameter thereof should become a specified dimension.

When manufacturing a ferritic stainless steel welding wire using a wire rod of the above-mentioned composition, the grain number of the wire rod is preferably set to 3 to 10 in the heat treatment, or the heat treatment is preferably done so that the grain number of the rod should be 3 to 10. By setting the grain number within this range, breaking of the wire rod can be prevented during drawing process. If the grain number of the wire rod is below 3 and crystals become larger, breaking of the wire may occur during the subsequent drawing process due to the coarsened crystals. Fine refining cannot be attained in the ferritic stainless steel by any mechanical means other than cold reduction. For this reason, when the grain number of the wire rod falls below 3, manufacturing of the wire becomes substantially impossible. When the grain number exceeds 10 and the crystals become too small, breaking of the wire becomes more likely to occur during the drawing process. Even in this case, drawing can be done by subjecting the wire rod again to heat treatment to adjust the grain number of the wire rod. However, increased manufacturing steps will lead to complicated wire manufacturing. The grain number of the wire rod does not have any relationship with the grain number of the weld metal described above. The grain number of the wire rod is significantly affected by the heat treatment while the grain number of the weld metal is largely affected by the composition of the wire.

In order to set the grain number to 3 to 10 for a wire rod having the composition of the present invention, the wire rod may be heated at 900 to 1100 degrees C. and then quickly cooled down. By controlling the heating temperature, heating time or hours, and cooling speed, the grain number can be adjusted.

According to a manufacturing method of the present invention, it is possible to subject the wire rod having a diameter of 2 to 10 mm to heat treatment and then drawing which reduces the diameter of the wire rod down to 0.6 to 2 mm. Consequently, according to the method of the present invention, it is possible to prevent breaking of the wire during the drawing process and to provide a ferritic stainless steel welding wire with increased cracking resistance.

BRIEF DESCRIPTION OF THE DRAWINGS

FIG. 8 shows Table 1.
FIG. 9 shows Table 2.
FIG. 10 shows Table 3.
FIG. 11 shows Table 4.

DETAILED DESCRIPTION OF PREFERRED EMBODIMENT

Figure 1:
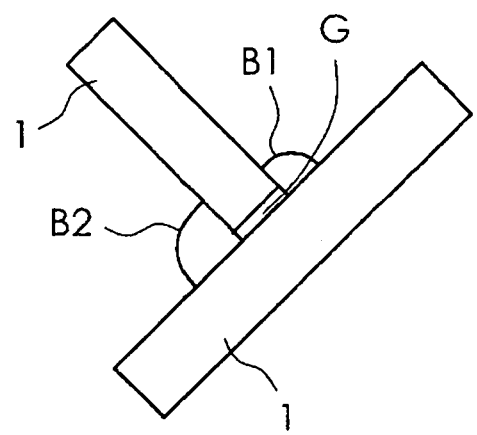
FIG. 1 is a side view showing how stainless steel plates have been welded for use in a cracking resistance test.

In order to confirm meritorious effects of the present invention, tests were conducted by using solid wires made of ferritic stainless steel welding wires of various compositions for the purpose of testing. First of all, several wire rods were made for the tests. They have a diameter of 5.1 to 5.5 mm, according to Embodiments 1 to 10 of the present invention and Comparisons 1 to 25 as indicated in Table 1 shown in FIG. 8. At least one of the Nb and Ta columns of the Table 1 indicates the lower limit (mass %, eight times the total mass % of C and N) for reference.

Each of the wire rods was subjected respectively to Heat Treatment 1 and Heat Treatment 2. In Heat Treatment 1, the wire rods were heated at 900 to 1100 degrees C. and then quickly cooled down. In Heat Treatment 2, the wire rods were heated at 700 to 900 degrees C. and then slowly cooled down. The grain number of each of the wire rods after the heat treatment was checked. It was also checked whether or not breaking of the wire occurred when each of the wire rods was heated and then drawn by using dies to reduce the diameter of the wire to 1.2 mm. As shown in FIG. 9, Table 2 indicates the results. The Japan Industrial Standard (JIS-G-0552) defines the grain number within a range of −3 to 10. In the tests, when the grain number exceeded this defined range, a numeric value of the grain number which exceeded the range was shown in the table.

In the Breaking Occurrence column of Table 2, when the grain number exceeded 3, a double circle symbol (◉) indicates that no breaking of the wire occurred. A circle symbol (○) indicates that breaking of the wire occurred once. A triangle symbol (Δ) indicates that breaking of the wire occurred more than twice. An × symbol (×) indicates that breaking of the wire occurred many times. When the grain number was 3 or less, a double circle symbol (◉) indicates that no breaking of the wire occurred. A circle symbol (○) indicates that breaking of the wire occurred once. An × symbol (×) indicates that the wire was broken due to coarsened crystals and further drawing became impossible.

As is known from Table 2, the wire rods of the present invention, Embodiments 1 to 10 have attained prevention of wire breaking during the drawing process when the wire rods were subjected to Heat Treatment 1, namely, heated at 900 to 1100 degrees C. and then quickly cooled down to place the grain number within a range of 3 to 10.

Next, tests were done for checking cracking resistance, flexural property, tensile strength, corrosion resistance, and oxidation resistance as well as measurement of the grain number of the weld metal was made, using the wire rods, Embodiments 1 to 10 and Comparisons 1 to 25 which had been subjected to Heat Treatment 2. As shown in FIG. 11, Table 3 indicates the results.

The cracking resistance test was conducted with reference to "Method of T-joint Weld Cracking Test"(JIS-Z-3153) of the Japan Industrial Standard. As shown in FIG. 1, two SUS430 stainless steel plates 1 of 19 mm (thickness)×150 mm (length)×80 mm (width) were arranged in a T-letter relation with a gap G of 1 mm provided therebetween. Then, the two stainless steel plates 1 were subjected to gas shielded arc welding using the wires (Embodiments 1 to 10 and Comparisons 1 to 25) to form a testing bead B1 and supporting bead B2. As the first step of gas shield arc welding, the supporting bead B2 was formed at a welding rate of 30 cm/min by flowing shield gas of Ar+20% $CO_2$ at a rate of 20 l/min with a current of 230 A and a voltage of 25 V. Next, the testing bead B1 was formed at two welding rates of 60 cm/min and 80 cm/min by flowing shield gas of Ar+20% $CO_2$ at a rate of 20 l/min with a current of 230 A and a voltage of 25 V. Then, the surface cracking rate (length of crack/length of bead)×100) was determined for the testing bead B1 excluding crater portions thereof. In the Cracking Rate column, a circle symbol (○) indicates zero (0)% cracking rate. A triangle symbol (Δ) indicates the cracking rate of above or more than 0% and lower than 30%, and an × symbol (×) indicates the cracking rate of 30% or more.

As is known from Table 3, when using the wires of Embodiments 1 to 10, compared with the wires of Comparisons 4, 5, 7, 9 to 11, 17, 18, 20, 21, 23, and 25, the cracking rate of the weld metal can be reduced.

The grain number of the weld metal was measured with reference to "Methods of Ferrite Grain Determination Test for Steels" (JIS-G-0552) of the Japan Industrial Standard. Weld metal crystals having a grain number of 3 or more are admitted as fine grains. The grain number of the weld metal does not have any relationship with the grain number of the wire rods shown in Table 2. The grain number of the weld metal is considerably affected by the composition of the wire, and the value thereof is accordingly determined. In contrast therewith, the grain number of the wire rod is largely affected by heat treatment applied to the wire rod, and the value thereof is accordingly determined.

As is known from Table 3, when using the wires of Embodiments 1 to 10, fine grains having a grain number of 3 or more were formed. In contrast therewith, when using the wires of Comparisons 1 to 5, 7 to 11, and 14 to 25, the grain number was below 3.

Figure 2:
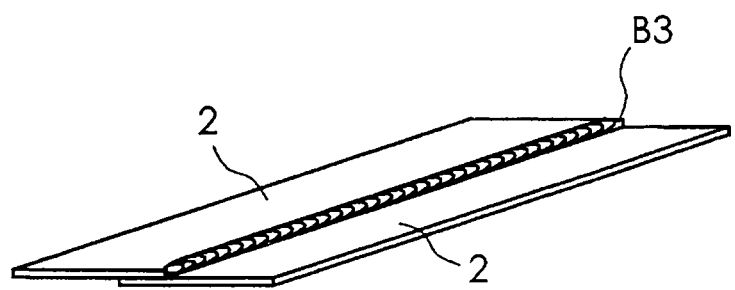
FIG. 2 is a perspective view showing how stainless steel plates have been welded for use in a bending test.
Figure 3:
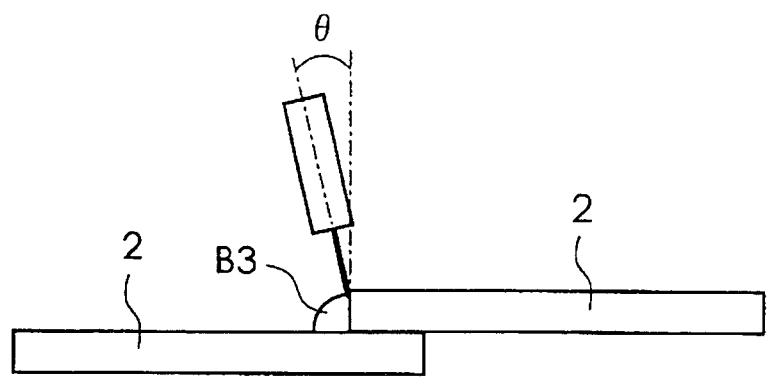
FIG. 3 illustrates how the stainless steel plates are welded for use in the bending test.
Figure 4:
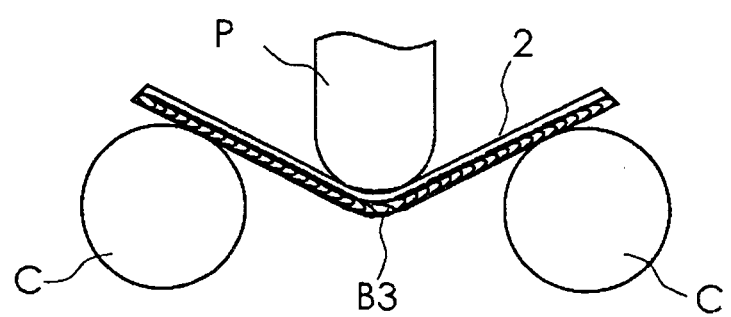
FIG. 4 illustrates how the welded stainless steel plates are subjected to the bending test.

The flexural property test was conducted as follows. As shown in FIG. 2, two SUS429Mod. stainless steel plates 2 of 1.5 mm (thickness)×150 mm (length)×50 mm (width) were arranged with the width-direction ends thereof being overlapped. Then, as shown in FIG. 3, the two stainless steel plates 2 were subjected to gas shielded arc welding using the wires (Embodiments 1 to 10 and Comparisons 1 to 25) to form a bead B3 at a torch angle (θ) of 10 degrees. The bead B3 was formed at a welding rate of 80 cm/min by flowing shield gas of Ar+20% $CO_2$ at a rate of 20 l/min with a current of 150 A and a voltage of 24 V. As shown in FIG. 4, the bead was arranged on the side of two cylinders C having a diameter of 32 mm disposed at a pitch of 100 mm. The two stainless steel plates 2 were arranged on the two cylinders C in such a manner that the length-direction ends of the plates 2 were abutted onto the cylinders C. Then, by pushing a press die, which has a curved tip having a diameter of 13.5 mm, onto the bead B3 from a direction perpendicular to the longitudinal direction of the bead, the welded two stainless steel plates were bent to a depth of 20 mm, 40 mm and 60 mm respectively, namely, to the extent that the distance from a line commonly tangent to the two cylinders was 20 mm, 40 mm and 60 mm respectively. Then, the surface of the bead was examined to see if there were cracks by liquid penetrant examination. In the Cracking Resistance column of Table 3, a circle symbol (○) indicates no cracks. A triangle symbol (Δ) indicates that there were two or less cracks of 1 mm or less in length. A × symbol (×) indicates that there were three or more cracks of 1 mm or more in length.

As is known from Table 3, when using the wires of Embodiments 1 to 10, compared with the wires of Comparisons 1, 4, 5, 7, 8, 11, and 14 to 25, crack occurrence can be prevented, namely, the flexural property can be increased.

Figure 5:
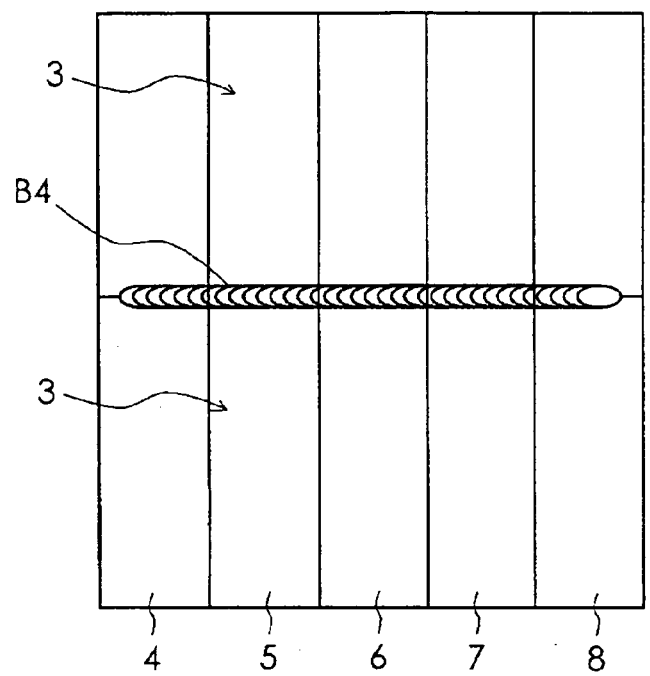
FIG. 5 is a plane view showing how stainless steel plates have been welded for use in tests of tensile strength, corrosion resistance, and oxidation resistance.

The tests for tensile strength, corrosion resistance, and oxidation resistance were carried out using test specimens 4 to 8 shown in FIG. 5. These test specimens were prepared as follows. First, two SUS429Mod. stainless steel plates 3 of 1.5 mm (thickness)×250 mm (length)×150 mm (width) were arranged so that the width-direction ends thereof were overlapped by 10 mm. Next, the two stainless steel plates 3 were subjected to gas shielded arc welding to form the bead B4. As with the flexural property test described above, gas shielded arc welding was done at a welding rate of 80 cm/min by flowing shield gas of Ar+20% $CO_2$ at a rate of 20 l/min with a current of 150 A and a voltage of 24 V. Then, the welded two stainless steel plates 3 were equally divided into five pieces, namely, test specimens 4 to 8. Out of these five specimens, the inner three specimens were used in the tests for tensile strength, corrosion resistance, and oxidation resistance, respectively. The outer two specimens 4, 8 were discarded.

Figure 6:
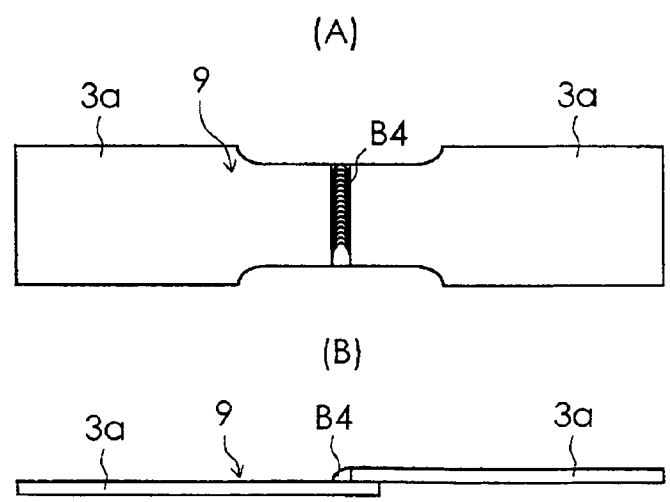
FIGS. 6(A) and 6(B) are respectively a plane view and a side view of a test specimen for use in the tensile test.

In the tensile strength test, as shown in FIGS. 6(A) and 6(B), a test specimen 9 was prepared so that a constriction of 40 mm both in length and width was formed in a central portion of the test specimen 5. Then, the test specimen 9 was pulled from both ends thereof each at room temperature, 700 and 900 degrees C. Force per unit area (MPa), namely tensile strength, was measured as the test specimen 9 was broken down. In the Tensile Strength column of Table 3, Comparisons 6, 14, 15, and 23 are shown with an asterisk (*), which indicates that the test specimens were made with the wire of the corresponding Comparisons and the test specimens were broken off from a portion of the weld metal (bead B4) thermally affected by welding. The remaining test specimens made with the wires (indicated without an asterisk) were broken off from the base material 3a. In either cases, when the test specimen was broken off from the weld metal or when the test specimen was broken off from the base material, a cross section of the broken portion was calculated based on the cross section of the corresponding base material.

As is known from Table 3, in any case where the wires of Embodiments 1 to 10 were used, the test specimen was broken off from the base material 3a. In contrast therewith, the test specimen was broken off from the weld metal (bead B4) when the wires of Comparisons 6, 14, 15, and 23 were used.

The corrosion resistance test was done with reference to "Method of Oxalic Acid Etching Test for Stainless Steels" (JIS-G-0571) of the Japan Industrial Standard. Specifically, part of the base material other than the weld metal (bead B4) was subjected to masking and then immersed in a 10% oxalic acid solution and electricity was applied to the test specimen at constant current density. Then, the specimen was checked to see if there were groove-like structures (or eroded portions) in the weld metal. In the Corrosion Resistance column of Table 3, a circle symbol (○) indicates that no groove-like structures were found in the weld metal. A triangle symbol (Δ) indicates that some groove-like structures were found partially in the weld metal. An × symbol (×) indicates that a groove-like structure was recognized in every crystal grain boundary of the weld metal.

As is known from Table 3, when using the wires of Embodiments 1 to 10 compared with the wires of Comparisons 1, 2, 6 to 8, 11 to 16, 18, 19, 22, and 24, corrosion resistance can be increased.

Figure 7:
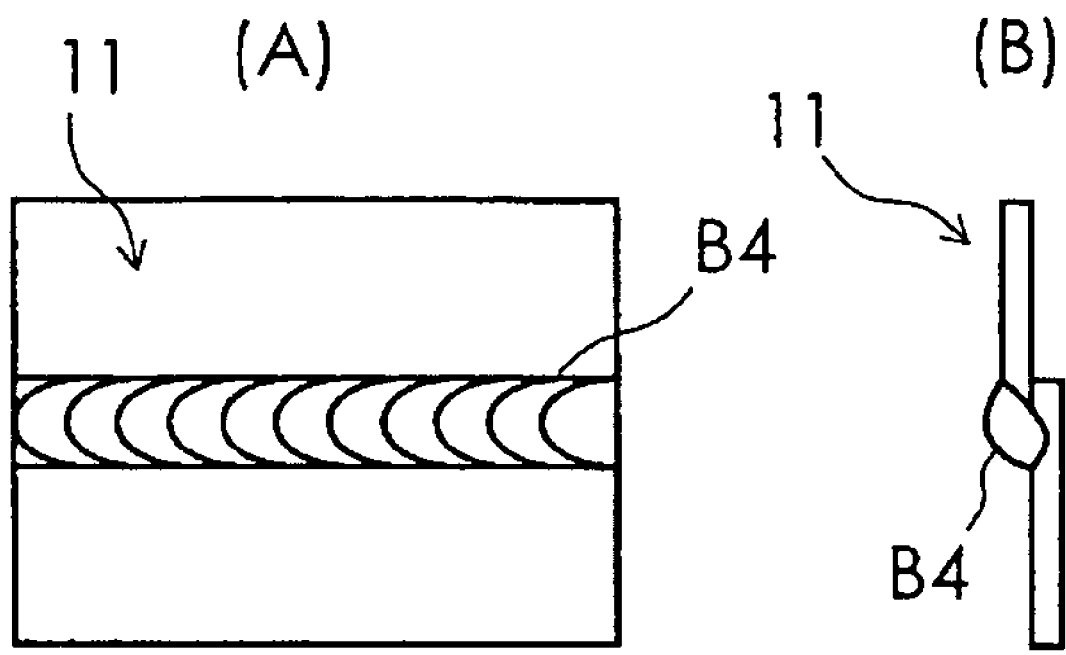
FIGS. 7(A) and 7(B) are respectively a plane view and side view of a test specimen for use in an oxidation resistance test.

In the oxidation resistance test, as shown in FIGS. 7(A) and 7(B), a test specimen 11 was prepared by cutting out a central portion of 40 mm in length and 30 mm in width from the specimen 7. The specimen 11 was being heated at 900 degrees C. in an atmosphere for 48 hours, and then an amount of increased oxidation ($g/cm^2$) was measured per unit area. An increase of 1 $g/cm^2$ or less in oxidation is admitted as good.

As is known from Table 3, when the wires of Embodiments 1 to 10 were used, all of the measured values are indicated as good, which means high oxidation resistance. When the wires of Comparisons 6, 14, 15, and 23 were used, an increase in oxidation exceeded 1 $g/cm^2$, which means low oxidation resistance.

As described so far, the entire test results shown in Table 3 indicate that when the wires of Embodiments 1 to 10 were used, a large grain number of the weld metal was obtained to make crystals finer, thereby increasing the cracking resistance, flexural property, tensile strength up to high temperature, corrosion resistance, and oxidation resistance of the weld metal.

As shown in FIG. 11, Table 4 indicates the results of the tests for cracking resistance, flexural property, tensile strength, corrosion resistance, and oxidation resistance as well as measurement of grain number of the weld metal when the wires of Embodiments 1 to 10 were subjected to Heat Treatment 1.

As is known from Table 4, when the wires were subjected to Heat Treatment 1, the wires of the present invention, namely, Embodiments 1 to 10 can attain the same meritorious effects as those shown in Table 3.

Further, the present invention is not limited to these embodiments, but various variations and modifications may be made without departing from the scope of the present invention.

What is claimed is:

1. A ferritic stainless steel welding wire used in gas shielded arc welding consisting essentially of, by mass, more than 0% and less than or equal to 0.03% C, more than 0% and less than or equal to 3% Si, more than 0% and less than or equal to 3% Mn, more than 0% and less than or equal to 2% Ni, 11 to 20% Cr, more than 0% and less than or equal to 3% Mo, more than 0% and less than or equal to 1% Co, more than 0% and less than or equal to 2% Cu, 0.02 to 2.0% Al, 0.2 to 1.0% Ti, more than 0% and less than or equal to 0.02% O, more than 0% and less than or equal to 0.04% N, and at least one of Nb and Ta, the mass % thereof being eight times the total mass percent of said C and said N to 1.0 mass %, the balance being Fe and unavoidable impurities.

2. A ferritic stainless steel welding wire used in gas shielded arc welding consisting essentially of, by mass, more than 0% and less than or equal to 0.03% C, more than 0% and less than or equal to 3% Si, more than 0% and less than or equal to 3% Mn, more than 0% and less than or equal to 2% Ni, 11 to 20% Cr, more than 0% and less than or equal to 3% Mo, more than 0% and less than or equal to 1% Co, more than 0% and less than or equal to 2% Cu, 0.02 to 2.0% Al, 0.2 to 1.0% Ti, more than 0% and less than or equal to 0.02% O, more than 0% and less than or equal to 0.04% N, at least one of Nb and Ta, the mass % thereof being eight times the total mass percent of said C and said N to 1.0 mass %, and at least one of more than 0 mass % and less than or equal to 0.04 mass % P, more than 0 mass % and less than or equal to 0.02 mass % S, more than 0 mass % and less than or equal to 0.5 mass % V, more than 0 mass % and less than or equal to 0.5 mass % W, more than 0 mass % and less than or equal to 0.02 mass % Zr, more than 0 mass % and less than or equal to 0.02 mass % B, more than 0 mass % and less than or equal to 0.005 mass % Ca, and more than 0 mass % and less than or equal to 0.005 mass % Mg, the balance being Fe and unavoidable impurities.

3. A method of manufacturing a ferritic stainless steel welding wire used in gas shielded arc welding, in which a wire rod is subjected to heat treatment and subsequently to drawing, said wire rod consisting essentially of, by mass, more than 0% and less than or equal to 0.03% C, more than 0% and less than or equal to 3% Si, more than 0% and less than or equal to 3% Mn, more than 0% and less than or equal to 2% Ni, 11 to 20% Cr, more than 0% and less than or equal to 3% Mo, more than 0% and less than or equal to 1% Co, more than 0% and less than or equal to 2% Cu, 0.02 to 2.0% Al, 0.2 to 1.0% Ti, more than 0% and less than or equal to 0.02% O, more than 0% and less than or equal to 0.04% N, and at least one of Nb and Ta, the mass % thereof being eight times the total mass percent of said C and said N to 1.0 mass %, the balance being Fe and unavoidable impurities, wherein when the number of crystals per mm² of a cross section of said wire rod is defined as m, a grain number expressed by an exponent (G) in an expression of $m=8\times 2^G$ is set to 3 to 10 by said heat treatment.

4. The method of manufacturing a ferritic stainless steel welding wire used in gas shielded arc welding according to claim 3, wherein said wire rod is heated at 900 to 1100 degrees C. in said heat treatment and then is quickly cooled down.

5. The method of manufacturing a ferritic stainless steel welding wire used in gas shielded arc welding according to claim 3, wherein said wire rod to be subjected to said heat treatment has a diameter of 2 to 10 mm, and the diameter of said wire rod is reduced to 0.6 to 2 mm by said drawing.

6. A method of manufacturing a ferritic stainless steel welding wire used in gas shielded arc welding, in which a wire rod is subjected to heat treatment and subsequently to drawing, said wire rod consisting essentially of, by mass, more than 0% and less than or equal to 0.03% C, more than 0% and less than or equal to 3% Si, more than 0% and less than or equal to 3% Mn, more than 0% and less than or equal to 2% Ni, 11 to 20% Cr, more than 0% and less than or equal to 3% Mo, more than 0% and less than or equal to 1% Co, more than 0% and less than or equal to 2% Cu, 0.02 to 2.0% Al, 0.2 to 1.0% Ti, more than 0% and less than or equal to 0.02% O, more than 0% and less than or equal to 0.04% or N, at least one of Nb and Ta, the mass % thereof being eight times the total mass percent of said C and said N to 1.0 mass %, and at least one of more than 0 mass % and less than or equal to 0.04 mass % P, more than 0 mass % and less than or equal to 0.02 mass % S, more than 0 mass % and less than or equal to 0.5 mass % V, more than 0 mass % and less than or equal to 0.5mass % W, more than 0 mass % and less than or equal to 0.02 mass % Zr, more than 0 mass % and less than or equal to 0.02 mass % B, more than 0 mass % and less than or equal to 0.005 mass % Ca, and more than 0 mass % and less than or equal to 0.005 mass % Mg, the balance being Fe and unavoidable impurities, wherein when the number of crystals per mm² of a cross section of said wire rod is defined as m, a grain number expressed by an exponent (G) in an expression of $m=8\times 2^G$ is set to 3 to 10 by said heat treatment.

7. The method of manufacturing a ferritic stainless steel welding wire used in gas shielded arc welding according to claim 6, wherein said wire rod is heated at 900 to 1100 degrees C. in said heat treatment and then is quickly cooled down.

8. The method of manufacturing a ferritic stainless steel welding wire used in gas shielded arc welding according to claim 6, wherein said wire rod to be subjected to said heat treatment has a diameter of 2 to 10 mm, and the diameter of said wire rod is reduced to 0.6 to 2 mm by said drawing.

* * * * *